US006775268B1

(12) United States Patent
Wang et al.

(10) Patent No.: US 6,775,268 B1
(45) Date of Patent: *Aug. 10, 2004

(54) METHOD AND SYSTEM FOR MAPPING PACKET SERVICE CATEGORIES TO ASYMMETRIC DIGITAL SUBSCRIBER LINE LATENCY PATHS

(75) Inventors: Ray Wang, McLean, VA (US); Paul Y. B. Shieh, Westborough, MA (US)

(73) Assignee: 3Com Corporation, Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/518,445

(22) Filed: Mar. 3, 2000

(51) Int. Cl.[7] ................... H04L 12/66; H04L 12/28; H04J 3/16
(52) U.S. Cl. ................... 370/352; 370/395.1; 370/466
(58) Field of Search ................... 370/352, 354, 370/466, 395.21, 395.6, 395.61, 395.65, 395.1, 419, 463, 392

(56) References Cited

U.S. PATENT DOCUMENTS

| 5,408,260 A | 4/1995 | Arnon |
| 5,519,731 A | 5/1996 | Cioffi |
| 5,521,906 A | 5/1996 | Grube et al. |
| 5,619,505 A | 4/1997 | Grube et al. |
| 5,627,501 A | 5/1997 | Biran et al. |
| 5,822,374 A | 10/1998 | Levin |
| 5,889,856 A | 3/1999 | O'Toole et al. |
| 5,910,970 A | 6/1999 | Lu |
| 5,999,518 A | 12/1999 | Nattkemper et al. |
| 6,049,531 A | 4/2000 | Roy |
| 6,208,637 B1 | 3/2001 | Eames |
| 6,396,837 B1 * | 5/2002 | Wang et al. ............ 370/395.21 |
| 6,480,976 B1 * | 11/2002 | Pan et al. .................... 714/701 |

FOREIGN PATENT DOCUMENTS

| WO | WO99/12330 | 3/1997 |
| WO | WO98/47251 | 10/1998 |

OTHER PUBLICATIONS

ADSLForumTR–001 "ADSL Forum System References Model," ADSL Forum Technical Report, May 1996, pp. 1–7.

Technical Report TR–002, "ATM Over ADSL Recommendations," ADSL Forum Technical Report, Mar. 1997, pp. 1–17.

Technical Report, TR–007, "Interfaces and System Configurations for ADSL: Customer Premises," ADSL Forum Technical Report, Mar. 1998, pp. 1–26.

Kyees, P.J. et al., *ADSL: A New Twisted–Pair Access to the Information Highway*, IEEE Communications Magazine, vol. 33, Issue 4, Apr. 1995, pp. 52–60.

Huang, Yin–Hwa et al., *Design of an MPEG–Based Set–Top Box for Video on Demand Services*, Acoustics, Speech, and Signal Processing, 1995, ICASSP–95., 1995 International Conference, vol. 4, ISBN: 0–7803–2431–5, May 9–12, 1995, pp. 2655–2658.

* cited by examiner

*Primary Examiner*—Andy Lee
(74) *Attorney, Agent, or Firm*—McDonnell Boehnen Hulbert & Berghoff LLP

(57) ABSTRACT

A method and system for packet service category requests to asymmetric digital subscriber line ("ADSL") latency paths. A data packet request from a customer premise distribution network with a desired service category (e.g., quality-of-service) and a desired latency is mapped to an ADSL device latency interface by checking a latency mapping policy. This mapping provides a virtual connection with a desired service category and a desired latency over ADSL links. The latency mapping includes an embedded service category mapping allowing differential services to be provided for user information based on a desired service category. The latency mapping mechanism may allow easier use of end-to-end packet service categories such as type-of-service categories, for data packets such as Internet Protocol ("IP") data packets, or Voice over IP ("VoIP") data packets over real-time asymmetric digital subscriber line links.

20 Claims, 8 Drawing Sheets

ASYMMETRIC DATA TRANSMISSION SYSTEM

METHOD AND SYSTEM FOR MAPPING PACKET SERVICE CATEGORIES TO ASYMMETRIC DIGITAL SUBSCRIBER LINE LATENCY PATHS

FIELD OF THE INVENTION

This invention relates to latency control in communication devices. More specifically it relates to a method for mapping packet service categories to latency paths in asymmetric digital subscriber line transmission systems.

BACKGROUND OF THE INVENTION

Many applications used from digital computers are asymmetric. For example, video on demand, Internet access, intranet access, remote local area network access, multimedia access, are specialized services that typically require high data rates downstream, but have relatively low data rates demands upstream.

An Asymmetric Digital Subscriber Line ("ADSL"), is a communications technology that transmits an asymmetric data stream over a conventional twisted pair of telephone wires. An Asymmetric Digital Subscriber Line transmits a larger data rate downstream to a subscriber from a telephony switching office than from a subscriber back to the telephony switching office. Asymmetric Digital Subscriber Lines typically transmit about 1.5 Mega bits-per-second ("Mbps") to about 9 Mbps downstream to a subscriber, and about 16 kilo-bps ("kbps") to 640 kbps upstream back to a telephony switching office. The asymmetric data rates depend on a number of factors, including length of the twisted pair of copper wires, copper wire gauge, and cross-coupled interference.

An ADSL system typically comprises two asymmetric devices connected by a conventional twisted pair of copper wires. An ADSL Transmission Unit-Central ("ATU-C") is a device at one end of an ADSL connection at a telephony or other switching office. An ADSL Transmission Unit-Remote ("ATU-R") is a device at another end of an ADSL connection at a subscriber or customer site.

The ATU-R may be integrated into a service module. A service module typically converts received digital signals into signals suitable for particular subscriber or customer premise equipment. The ATU-C may be integrated within an access node. An access node typically includes digital loop carrier systems such as a Digital Subscriber Line Access Multiplexer ("DSLAM") concentrating individual connections to T1 lines, E1 lines cellular antenna sites, Private Branch Exchanges ("PBXs"), Optical Network Units ("ONUs") or other carrier systems.

ADSL systems typically use Discrete Multi-Tone Modulation ("DMT") for data transmission. Low speed services, such as Plain Old Telephone Service ("POTS"), are carried in a baseline modulation frequency or low frequency, while higher speed multimedia services are modulated at higher frequencies.

Some applications require transport of packet data. An Asynchronous Transfer Mode ("ATM") system can use high-speed services on ADSL systems as a physical layer to transport data packets. As is known in the art, ATM is a high-speed packet transmission mode. ATM segments and multiplexes data traffic into small, fixed-length units called "cells." A cell is 53-octects, with 5-octects for the cell header, and 48-octects for the cell data. ATM provides four services category classes that may use constant bit-rates, variable bit-rates, available bit-rates and unspecified bit-rate services.

Another high-speed packet transmission mode includes Frame Relay. As is known in the art, Frame Relay is packet-switching protocol for use on wide area networks ("WANs"). Frame relay transmits variable-length packets at up to 2 Mbps over predetermined, set paths known as PVCs (permanent virtual circuits).

Another mode of packet transmission includes the Internet Protocol ("IP"). As is known in the art, IP is a routing protocol designed to route traffic within a network or between networks. Voice over Internet Protocol ("VoIP") is a protocol that can be used to send voice information in IP packets.

An ADSL system typically includes one or more "splitters." Splitters are filters that separate high frequency and low frequency ADSL signals. A splitter may be integrated into ATU-C or ATU-R, physically separated from the ATU-C or ATU-R, or divided between high pass and low pass functionality, with the low pass functionality physically separated from the ATU-C or ATU-R.

An ADSL system can also be used without splitters. The Splitterless ADSL standard is called "G.lite." G.lite is a new standard that uses DMT baseline modulation delivering a maximum downstream bandwidth of up to 1.4 Mbps, but is less sensitive to noise and other transmission problems.

Two modes of latency have been specified for ADSL systems. The purpose of latency is to provide a data path through an ADSL system that can be used to provide a service category. For example, a data path can be provided between an ADSL transmission unit and a virtual circuit connection for a transport protocol such ATM, Frame Relay or others. A data path can also be provided between an ADSL transmission unit and a packet connection for a customer premise distribution protocol such as the Internet Protocol. The latency path is used for carrying user traffic that has different service requirements in terms of delay and reliability. Generally, two latency paths are defined: a "Fast" path and an "Interleaved" path. The Fast latency path corresponds to a lower reliability, shorter delay path. The Interleaved latency path corresponds to higher reliability, longer delay path.

There are several problems associated with using latency paths between ADSLs and the Internet Protocol or other protocols used on premise distribution networks. One problem is that it is possible to use three or more latency classes on a latency path including: (1) single latency, that is not necessarily the same for each direction of transmission; (2) dual latency downstream with single latency upstream; and (3) dual latency both upstream and downstream. Multiple latency classes on a single latency path complicates any latency mapping.

Another problem is since the functionality of a latency path is typically located in a transmission convergence sub-layer, a mapping mechanism is necessary to map a service request to a corresponding latency path. However, most mapping mechanisms known in art are dependent on the architecture of the transmission sub-layer and vary with the type of transmission hardware being used. In addition, most mapping mechanisms known in the art do not provide a mechanism to map service category request, such as quality-of-service requests to a latency path at an ADSL transmission convergence sub-layer.

Since a latency path is typically located in a transmission convergence sub-layer, an additional mapping mechanism at a service specific convergence sub-layer may also be needed if a network is using a customer premise distribution network protocol such as the Internet Protocol, that allows Type-of-Service categories to be used.

Thus, it is desirable to have a generic mapping procedure that will map a service category request from a customer premise distribution network to an ADSL latency path. The generic mapping procedure should also be independent of the underlying architecture of the system it is used on and provide the ability to map service category requests including Type-of-Service requests, from premise distribution network protocols to a latency path on an ADSL system.

SUMMARY OF THE INVENTION

In accordance with preferred embodiments of the present invention, some of the problems associated with mapping packet service category requests to ADSL latency paths are overcome. A method and system for mapping packet service categories to ADSL latency paths is presented.

One aspect of the invention includes a method for mapping outgoing data packet service categories to latency paths in an asymmetric data transmission system. The method includes creating a desired ADSL latency mapping for desired service category requests for outgoing data packets in a customer premise distribution network protocol and packing the outgoing data packets into outgoing data cells in a transport network protocol using the latency mapping.

Another aspect of the invention includes a method for transparently transferring information from incoming data cells from a transport network in a transport protocol with a desired service category and a pre-determined latency mapping, into incoming data packets for a customer premise distribution network protocol.

Another aspect of the invention includes a latency mapping system for an asymmetric data transmission system. The system includes a latency mapping policy, a service specific convergence sub-layer and a transmission convergence sub-layer. However, the latency mapping system may have more, fewer or equivalent components and is not limited to the three described components. The latency mapping policy is used for mapping a desired service category for a customer premise distribution protocol to an asymmetric digital subscriber line latency path. The service specific convergence sub-layer examines service category requests from outgoing data packets, maps service category requests to an ADSL latency path, packs outgoing data packets for a customer premise distribution protocol into multiple data cells for a transport protocol and re-assembles information multiple incoming data cells from a transport network into multiple incoming data packets for a customer premise distribution protocol. The transmission convergence sub-layer accepts multiple outgoing data cells in a transport protocol created from multiple outgoing data packets for a customer premise distribution protocol with a determined asymmetric digital subscriber line latency mapping for a desired service category request, and accepts multiple incoming data cells in a transport protocol with a pre-determined asymmetric digital subscriber line latency mapping for a desired service category request.

The present invention may help overcome some of the problems associated with packet service category latency mapping to ADSL links. A mapping to latency paths on ADSL system may allow differential services to be provided for user data from a customer premise distribution network based on a desired packet service category. The latency mapping mechanism at an ADSL link may help provide end-to-end virtual connections over real-time ADSL links.

The foregoing and other features and advantages of preferred embodiments of the present invention will be more readily apparent from the following detailed description.

The detailed description proceeds with references to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Exemplary Asymmetric Data Transmission System

Figure 1:
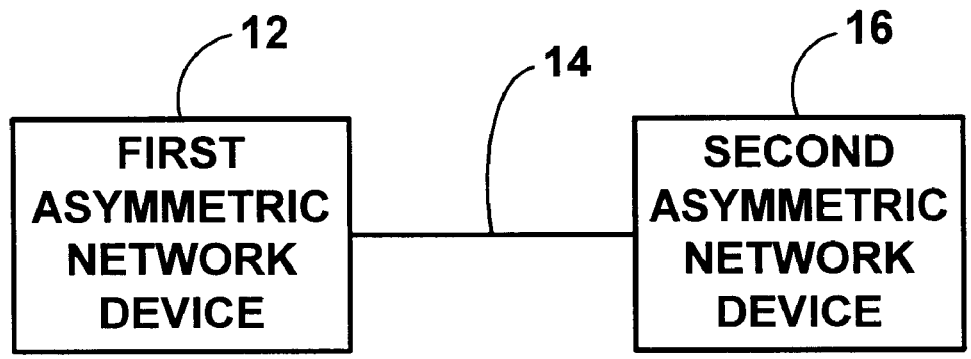
FIG. 1 is a block diagram illustrating an exemplary asymmetric data transmission system.

FIG. 1 is a block diagram illustrating an exemplary asymmetric data transmission system 10 for a preferred embodiment of the present invention. In the asymmetric data transmission system 10, data is transmitted at a higher data rate in a downstream direction, than in an upstream direction. However, the asymmetric data transmission can also be reversed. The asymmetric data transmission system 10 can also be used for symmetric data transmission. The asymmetric data transmission system 10 includes a first asymmetric network device 12, a connection 14, and a second asymmetric network device 16. However, the asymmetric data transmission system 10 is not limited to the network devices and connection illustrated in FIG. 1, and more or fewer network devices and connections can also be used. Splitters are not illustrated in FIG. 1, and may or may not be used in the asymmetric data transmission system 10.

In one exemplary preferred embodiment of the present invention, the connection 14 is conventional twisted pair of copper wires. The first asymmetric network device 12 is an Asymmetric Digital Subscriber Line ("ADSL") Transmission Unit-Remote ("ATU-R"). The second asymmetric network device 16 is an ADSL Transmission Unit-Central ("ATU-C"). However, the present invention is not limited to this exemplary preferred embodiment and other network devices and connections can also be used.

The Asymmetric network devices 12, 16 for preferred embodiments of the present invention include network devices that can interact with the asymmetric network system 10 based on all or part of standards proposed by the Institute of Electrical and Electronic Engineers ("IEEE"), International Telecommunications Union-Telecommunication Standardization Sector ("ITU"), Internet Engineering Task Force ("IETF"), American National Standard Institute ("ANSI"), or the ADSL Forum. However, network devices based on other standards could also be used. IEEE standards can be found on the World Wide Web at the Universal Resource Locator ("URL") "www.ieee-.org." The ITU, (formerly known as the CCITT) standards can be found at the URL "www.itu.ch." IETF standards can be found at the URL "www.ietf.org." The ANSI standards can be found at the URL "www.ansi.org." ADSL Forum documents can be found at the URL "www.adsl.com."

The ANSI standard "Network and Customer Installation Interfaces—Asymmetric Digital Subscriber Line (ADSL) Metallic interface," ANSI-T1.413-1995, and the ITU standards "Asymmetrical digital subscriber line (ADSL) transceiver," ITU-G.992.1-1999, and "Splitterless Asymmetrical Digital Subscriber Line Transceivers," ITU-G.992.2-1999, are incorporated herein by reference.

In one exemplary preferred embodiment of the present invention, the asymmetric data transmission system 10 includes asymmetric network devices compliant with all or part of ANSI or ITU ADSL standards. (e.g., ANSI-T1.413-1995 or ITU-G.992.1-1999). In another exemplary preferred embodiment of the present invention, the asymmetric data transmission system 10 includes a splitter-less ADSL data transmission system with network devices compliant with all or part of ITU splitter-less ADSL standards. (e.g., ITU-G.992.2-1999). The first asymmetric network device 12 is an ADSL ATU-R device, the second asymmetric device 16 is an ADSL ATU-C device, and the connection 14 is a conventional twisted pair of copper wires. However, the present invention is not limited to this embodiment and other asymmetric network devices and connections can also be used.

An operating environment for asymmetric network devices 12, 16 of the present invention include a processing system with one or more high speed Central Processing Unit(s) ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Asymmetric Digital Subscriber Line Data Transmission System

Figure 2:
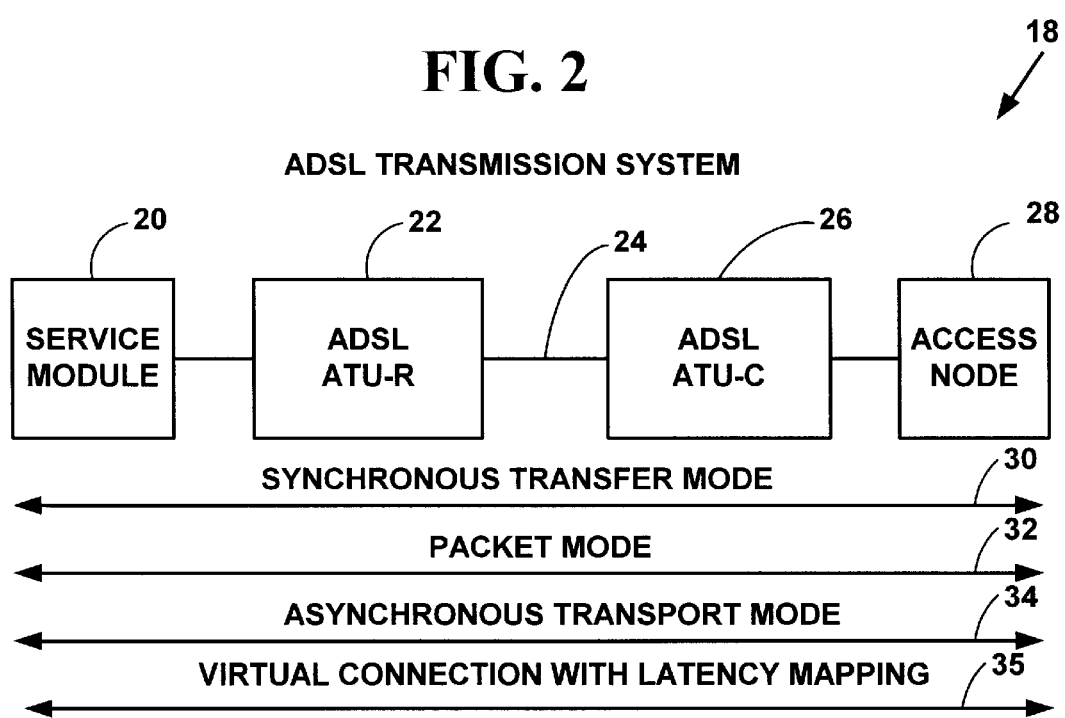
FIG. 2 is a block diagram illustrating an exemplary ADSL data transmission system.

FIG. 2 is a block diagram illustrating an exemplary asymmetric digital subscriber line data transmission system 18 for one exemplary a preferred embodiment of the present invention. In the asymmetric digital subscriber line data transmission system 18, data is transmitted at a higher data rate in downstream direction, than in an upstream direction. However, the asymmetric data transmission can also be reversed. The data transmission can also be symmetric. The asymmetric data asymmetric digital subscriber line transmission system 18 includes a service module 20, an ADSL ATU-R interface 22, an ADSL connection 24 comprising a twisted pair of copper wires, an ADSL ATU-C interface 26 and an access node 28 (e.g., a Digital Subscriber Line Access Multiplexer ("DSLAM")).

The asymmetric data transmission system 18 also includes the capability for a synchronous transfer mode 30, a packet transfer mode 32 an ATM 34 transfer mode, and creation of a virtual connection with a desired latency mapping 35 for a desired service category as is explained below. However, the asymmetric data transmission system 18 is not limited the network devices, connection or transfer modes illustrated in FIG. 2, and more or fewer network devices connections or transfer modes can also be used.

As was described above, an ADSL ATU-R interface 22 is a network device at an end of the ADSL connection 24 at a subscriber or customer site. Although illustrated as a discrete component, the ADSL ATU-R device 22 may be integrated into a service module 20. The ADSL ATU-C device 26 is a network device at an end of the ADSL connection 24 at a telephony switch or other switching device. Although illustrated as a discrete component, the ADSL ATU-C interface 26 may also be integrated within the access node 28. The ADSL ATU-R 22 and ADSL ATU-C 26 devices include but are not limited to ADSL devices from 3Com Corporation, of Santa Clara, Calif., Cisco Systems of San Jose, Calif., Ericsson Corporation, of Stockholm, Sweden, and others.

The service module 20 converts digital signals into signals suitable for use on a subscriber or customer site. The access node 28 typically includes digital loop carrier systems concentrating individual voice lines to T1 lines, E1 lines, cellular antenna sites, Private Branch Exchanges ("PBXs"), Optical Network Units ("ONUs") and other wireline and wireless carrier systems. In one exemplary preferred embodiment of the present invention, the asymmetric data transmission system 18 includes an ADSL network device compliant with all or part of ANSI or ITU ADSL standards (e.g., ANSI-T1.413-1995 or ITU-G.992.1-1999). In another exemplary preferred embodiment of the present invention, the asymmetric data transmission system 18 includes a splitterless ADSL data transmission system, or G.lite data transmission system. The network devices in such a system are compliant with all or part of the ITU spliterless ADSL standard (e.g., ITU-G.992.2-1999). Splitters are not illustrated in FIG. 2, and may or may not be used in asymmetric data transmission system 18. However, the present invention is not limited to this embodiment and other asymmetric data transmission systems and other standards can also be used.

Exemplary Asymmetric Digital Subscriber Line Access Node

Figure 3:
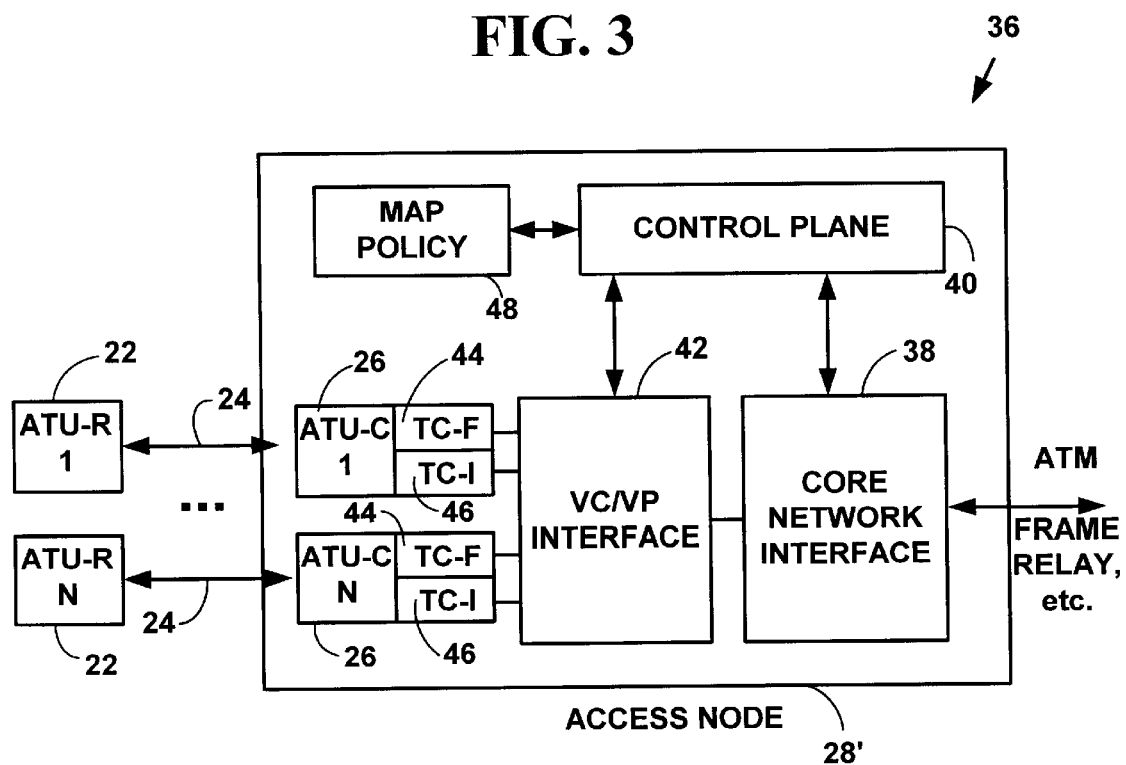
FIG. 3 is a block diagram illustrating an exemplary access node used in the exemplary ADSL data transmission system of FIG. 2.

FIG. 3 is a block diagram illustrating an exemplary access node 36 used in the ADSL transmission system 18. The access node 36 includes a core network interface 38, a control plane 40, a virtual channel/virtual path interface 42, and multiple latency interfaces 44, 46, a latency mapping policy 48 and a multiple ADSL ATU-C 26 interfaces. However, more, fewer or equivalent components can be used in the access node 36, and the present invention is not limited to the described components.

The access node 36 serves as a transport multiplexer/concentrator between a transport network (e.g., ATM or Frame Relay, etc.) and a customer premise distribution network or other network. In the outgoing direction it may perform routing/demultiplexing, while in the incoming direction it may perform multiplexing/concentration and higher layer functions, such as latency mapping described below.

In an exemplary preferred embodiment of the present invention, the core network interface 38 of the access node 36 includes an ATM, Frame Relay, or other interface to a corresponding ATM, Frame Relay, or other transport network. However, the present invention is not limited to ATM or Frame Relay interfaces and other network core interfaces could also be used with other transport networks.

As was discussed above, ATM is a high-speed packet transmission mode. ATM segments and multiplexes data traffic into small, fixed-length units called "cells." A cell is 53-octects, with 5-octets for the cell header, and 48-octects for the cell data. ATM often uses ADSL technologies as a physical layer to transmit packet data. For more information on ATM, see "B-ISDN ATM Adaptation Layer specification," ITU-I.363.3-1996, and "Functional characteristics of ATM equipment, ITU-I.732-1996, and "Functional Architecture of transport networks based on ATM," ITU-I.326-1995, all of which are incorporated herein by reference.

For more information on using ATM with ADSL see, "ATM over ADSL Recommendation," TR-017, ADSL Forum, March 1999, "ADSL Forum Recommendation for ATM Layer of ADSLs," TR-021, ADSL Forum, December 1998, "T1.413 Issue 2 ATM basedADSL ICS," TR-026, September 1999, all of which are incorporated herein by reference.

As is known in the art, the ATM layer provides a range of alternative service types/classes for the transport of octet steams/messages generated by higher protocol layers. The ATM service types can be used to provide Class-of-Service ("CoS") or Quality-of-Service ("QoS") on a connection.

As is known in the art, CoS provides a reliable (e.g., error free, in sequence, with no loss of duplication) transport facility independent of a QoS. CoS parameters include maximum downstream data rates, maximum upstream data rates, upstream channel priority, guaranteed minimum data rates, guaranteed maximum data rate and other parameters.

QoS collectively specifies the performance of a network service that a device expects on a network. QoS parameters include transit delay expected to deliver data to a specific destination, the level of protection from unauthorized monitoring or modification of data, cost for delivery of data, expected residual error probability, the relative priority associated with the data and other parameters.

The ATM services types for QoS are classified according to three criteria: (1) the existence of a timing relationship between a source and destination; (2) a bit rate associated with a transfer; and (3) a connection mode. Table 1 illustrates ATM services types.

TABLE 1

| Service Category Identifier | Service | Description |
| --- | --- | --- |
| CBR | Constant Bit Rate | CBR service category is intended for real-time applications, i.e., those requiring tightly constrained delay and delay variation, as would be appropriate for voice and video applications. |

TABLE 1-continued

| Service Category Identifier | Service | Description |
| --- | --- | --- |
| | | Typically a connection-oriented service. Timing required between source and destination. |
| rt-VBR | Real-time Variable Bit Rate | The real-time VBR service category is intended for real-time applications (i.e., those requiring tightly constrained delay and delay variation), as would be appropriate for voice and video applications. Typically a connection-oriented service. Timing required between source and destination. |
| nrt-VBR | Non-real-time Variable Bit Rate | The non-real-time VBR service category is intended for non-real-time applications that have bursty traffic characteristics. Connection-oriented or connection-less service. No timing required between source and destination. |
| UBR | Unspecified Bit Rate | The UBR service category is intended for non-real-time applications (i.e., those not requiring tightly constrained delay and delay variation). Examples of such applications are traditional computer communications applications such as file transfer and Email. UBR sources are expected to be bursty. UBR service does not specify traffic-related service guarantees. Specifically, UBR does not include the notion of a per-connection negotiated bandwidth. Typically a connection-less service. |
| ABR | Available Bit Rate | ABR is an ATM layer service category for which the limiting ATM layer-transfer characteristics provided by the network may change subsequent to connection establishment. Connection-oriented or connection-less service. |

As was discussed above, Frame Relay is packet-switching protocol typically used on Wide Area Networks ("WANs"). Frame relay transmits variable-length packets at up to 2 Mbps over predetermined, set paths known as PVCs (permanent virtual circuits). For more information on Frame Relay see "Framework for Frame Mode Bearer Services," ITU-I.122-1993, "Frame Mode Bearer Services," ITU-I.223-1992, "Frame Mode Bearer Services Interworking," ITU-I.555-1992, "Signaling Specification for Frame Relay Bearer Service for DSS1," ANSI-T1.617-1991 and "Core Aspects of Frame Protocol for Use with Frame Relay Bearer Service," ANSI-T1.618-1991, all of which are incorporated by reference. Frame Relay can also provide service categories similar to those described for ATM.

The control plane 40 is responsible for establishing calls, establishing circuits and managing connections. The control plane 40 manages frame-mode bearer services, packet-mode services and circuit-switching services. The control plane 40 includes functionality for control signaling and Connection Admission Control ("CAC").

The virtual channel/virtual path interface 42 includes Virtual Path ("VP") and Virtual Channel ("VC") management. As is known in the art, a VC is a channel set up between two end users through a network, and a variable-rate, full duplex flow of cells is exchanged over the channel. VCs are used for user-network exchange (e.g., control signaling) and network-network exchanges (e.g., network management and routing). A VP is a bundle of VCs that have the same endpoints in a network. Typically all of the cells flowing over all of the VCs in a single VP are processed together. The virtual channel/virtual path interface 42 manages ATM Virtual Path Identifiers ("VPI"), Virtual Channel Identifiers ("VCI"), and Frame Relay Data Link Connection Identifiers ("DLCI") and other virtual connection identifiers. The virtual channel/virtual path interface 42 may also include other functionality such as latency mapping functionality.

If ATM is being used, the virtual channel/virtual path interface 42 manages VPIs and VCIs that identify an ATM virtual connection that has an ATM QoS illustrated in Table 1. If Frame Relay is being used the virtual channel/virtual path interface 42 manages the DCLIs with service categories similar to those used for ATM and illustrated in Table 1.

The multiple latency interfaces 44, 46 include multiple Transmission Convergence ("TC") sub-layer interfaces. A "TC-F" interface 44 is used for a "Fast" latency path and a "TC-I" interface 46 is used for an "Interleaved" latency path. The multiple latency interfaces include multiple ADSL ATU-C 26 interfaces, which are connected to multiple ADSL ATU-R interfaces 22 over multiple connections 24.

The mapping policy 48 is a set of rules that specify latency mapping for a desired service category including Cos or QoS. In a preferred embodiment of the present invention, the mapping policy 48 is defined and configured by a network administrator or by a user who has responsibility to manage the access node 36. However, the present invention is not limited to the mapping policy 48 created by a network administrator, and the mapping policy 48 can also be created by others.

Latency Mapping Over Virtual Connections in an ADSL System

Figure 4:
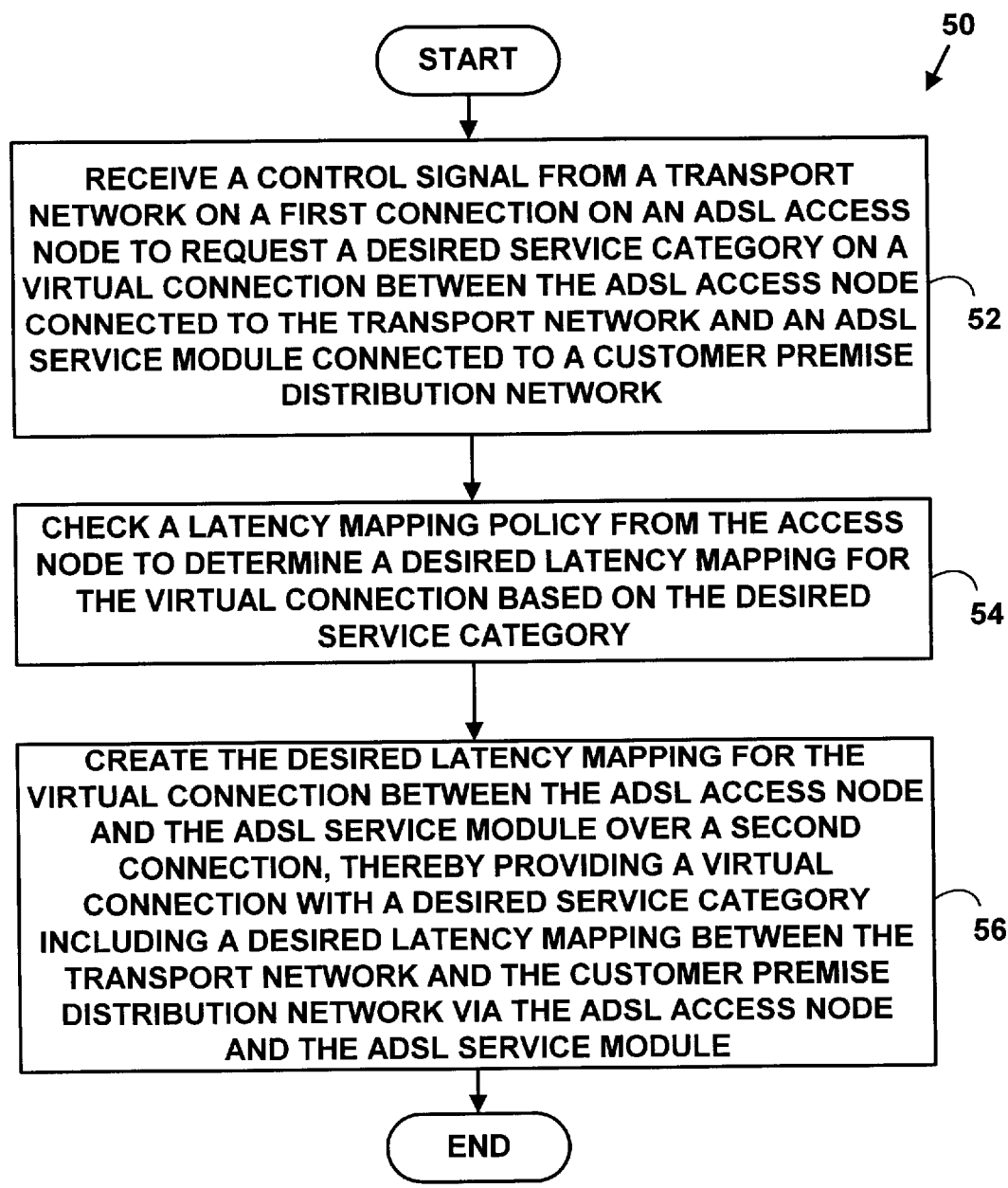
FIG. 4 is a flow diagram illustrating a method for latency path mapping in an asymmetric data transmission system.

FIG. 4 is a flow diagram illustrating a Method 50 for latency path mapping in an asymmetric data transmission system. At Step 52, a control signal is received from a transport network on an ADSL access node on a first connection to request a desired service category on a virtual connection between the ADSL access node connected to the transport network and an ADSL service module connected to a customer premise distribution network. At Step 54, a latency mapping policy is checked on the ADSL access node to determine a desired latency mapping for the virtual connection based on the desired service category. At Step 56, the desired latency mapping for the virtual connection is created between the ADSL access node and the ADSL service module over a second connection, thereby providing a virtual connection with a desired service category including a desired latency mapping between the transport network and the customer premise distribution network via the ADSL access node and the ADSL service module.

In one specific exemplary preferred embodiment of the invention, Method 50 is used on an ADSL transmission system 18 (FIG. 2). However, the present invention is not limited to such an embodiment and other ADSL transmission systems can also be used.

In such an embodiment, at Step 52, a control signal is received from a transport network, such as ATM, Frame Relay and others, on an ADSL access node 36 on a first connection to request a desired service category on a virtual connection between the ADSL access node 36 connected to the transport network and an ADSL service module 20 connected to a customer premise distribution network.

The desired service category includes a CoS, QoS or other service category for ATM, Frame Relay or other transport protocols used on a corresponding transport network. The control signal includes an ATM call setup signal, a Frame Relay call setup signal or other control signals that include a desired service category indicator.

At Step 54, a latency mapping policy 48 is checked from the access node 36 to determine a desired latency mapping for the virtual connection based on the desired service category. In one preferred embodiment of the present invention, the latency mapping policy 48 (FIG. 3) is checked from a Connection Admission Control function ("CAC") in the control plane 40. As is known in the art, the CAC function is not standardized, but a variable function maintained by a transport network service provider. However, the latency mapping policy 48 can be checked from other components and the present invention is not limited to checking the mapping policy from a CAC function in the control plane 40 or a latency mapping policy 48 maintained by a transport network service provider. Table 2 illustrates an exemplary latency mapping policy 48. However, the present invention is not limited to the exemplary latency mapping policy illustrated in Table 2 and other latency mapping policies can also be used.

TABLE 2

| Service Category Request | ADSL Latency Mapping |
|---|---|
| CBR | Fast |
| rt-VBR | Fast |
| nrt-VBR | Interleaved |
| UBR | Interleaved or Fast, depending on a specified application. |
| ABR | Interleaved or Fast, depending on a specified application. |

At Step 56, the desired latency mapping for the virtual connection is created between the ADSL access node 36 and the ADSL service module 20 over a second connection 24, thereby providing a virtual connection with a desired service category including a desired latency mapping between the transport network and the customer premise distribution network via the ADSL access node 36 and the ADSL service module 20.

In one preferred embodiment of the present invention, creating the desired latency mapping for the virtual connection includes creating the desired latency mapping at a Transmission Convergence ("TC") sub-layer on the ADSL access node 36. If ATM is being used, a VPI or VCI is mapped to a TC sub-layer latency type after a CAC function in the control plane 40 consults the mapping policy 48. The CAC function performs latency mapping by for the desired service category by calling a latency mapping function. The desired latency mapping is created between a first port (e.g., ATM, Frame Relay, etc. port) on a transport network interface and a second port on a latency interface (e.g., TC-F 44 or TC-I 46) on an ADSL ATU-C interface 26.

Exemplary ATM-to-ADSL Latency Mapping

In one specific exemplary example, an ATM port, such as ATM port zero ("ATM0") or ATM port one ("ATM1") is mapped to a TC-F 44 or TC-I 46 port on an ADSL ATU-C interface 26. An ATM Cell specific TC sub-layer ("Cell TC") is provided for each latency path separately. However, the present invention is not limited to such an embodiment, and other latency mappings can also be used.

Figure 5:
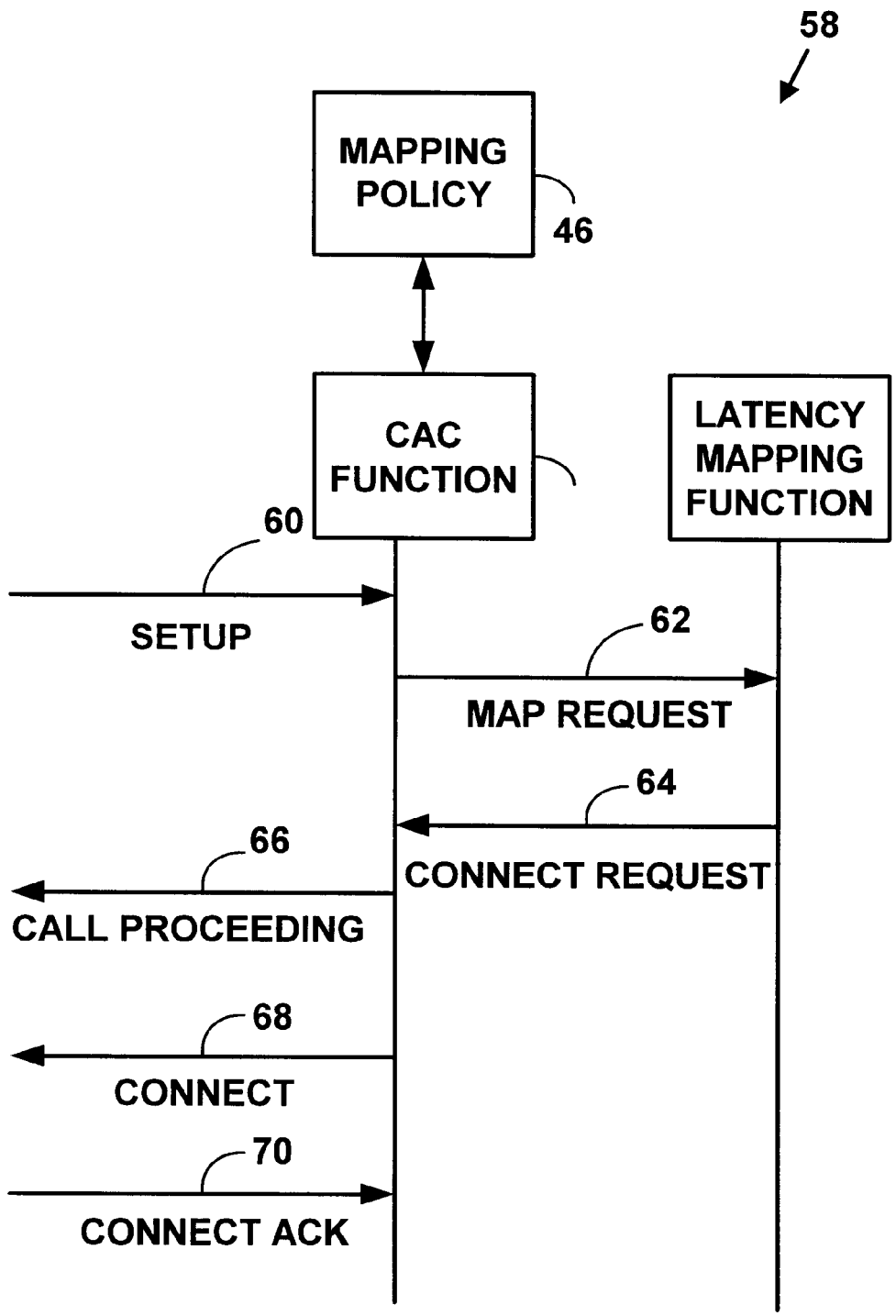
FIG. 5 is block diagram illustrating a data flow for an exemplary ATM-to-ADSL latency mapping.

FIG. 5 is block diagram illustrating a data flow 58 for an exemplary ATM-to-ADSL latency mapping. A call SETUP message 60, including a desired service category for a Switched Virtual Connection ("SVC") is received on the access node 36 (e.g., FIG. 4, at Step 52). The call SETUP message 60 is passed to a CAC function in the control plane 40 (FIG. 3). The CAC function determines if there are enough transport resources to grant the SVC. The CAC function in the control plane 40 also checks the mapping policy 48 to determine a latency mapping for the desired service category (e.g., QoS) received in the call SETUP message 60 (e.g., at Step 54).

The CAC creates a desired latency mapping (e.g., at Step 56) by calling a latency mapping function. In one preferred embodiment of the present invention, the latency function exists in the virtual channel/virtual path interface 42. However, the present invention is not limited to this implementation, and the latency function can also exists in other components of the ADSL access node 36 (e.g., the control plane 40). The latency mapping function can exist on the control plane 40 or in the virtual channel/virtual path interface 42.

The latency mapping function performs latency mapping from an ATM port to a TC-F 44 or TC-I 46 port on an ADSL ATU-C interface 26. The mapping is created before the CAC grants the call SETUP request 60. The latency mapping function sends a connect request indication 64 back to the CAC function indicating the desired latency mapping has been completed. The CAC function sends a CALL PROCEEDING message 66 to the network device that sent the call SETUP message 60 indicating a SVC has been allocated. The CAC function sends a CONNECT message 68 indicating the call with the desired service category has been accepted on a SVC by the access node 36. The CAC function receives a CONNECT ACKNOWLEDGEMENT 70 from the initiating network device indicating call acceptance has been acknowledged on a SVC. An end-to-end virtual connection with a desired service category including a desired latency mapping via the ADSL access node 36 is thereby created.

FIG. 5 illustrates latency mapping for ATM-to-ADSL. However, other transport protocols (e.g., Frame Relay, etc.) from their corresponding transport network would be mapped in a similar manner, and the present invention is not limited to ATM-to-ADSL latency mapping.

Latency path mapping at an ADSL access node, such as exemplary ADSL access node 36 is described in co-pending application Ser. No. 09/518,391 now U.S. Pat. No. 6,396,837, entitled "Method and System for Mapping Virtual Connections to ADSL Latency Paths," assigned to the same Assignee as the present application. Latency path mapping at an ADSL service module 20 is now described.

Exemplary Asymmetric Digital Subscriber Line Service Module

Figure 6:
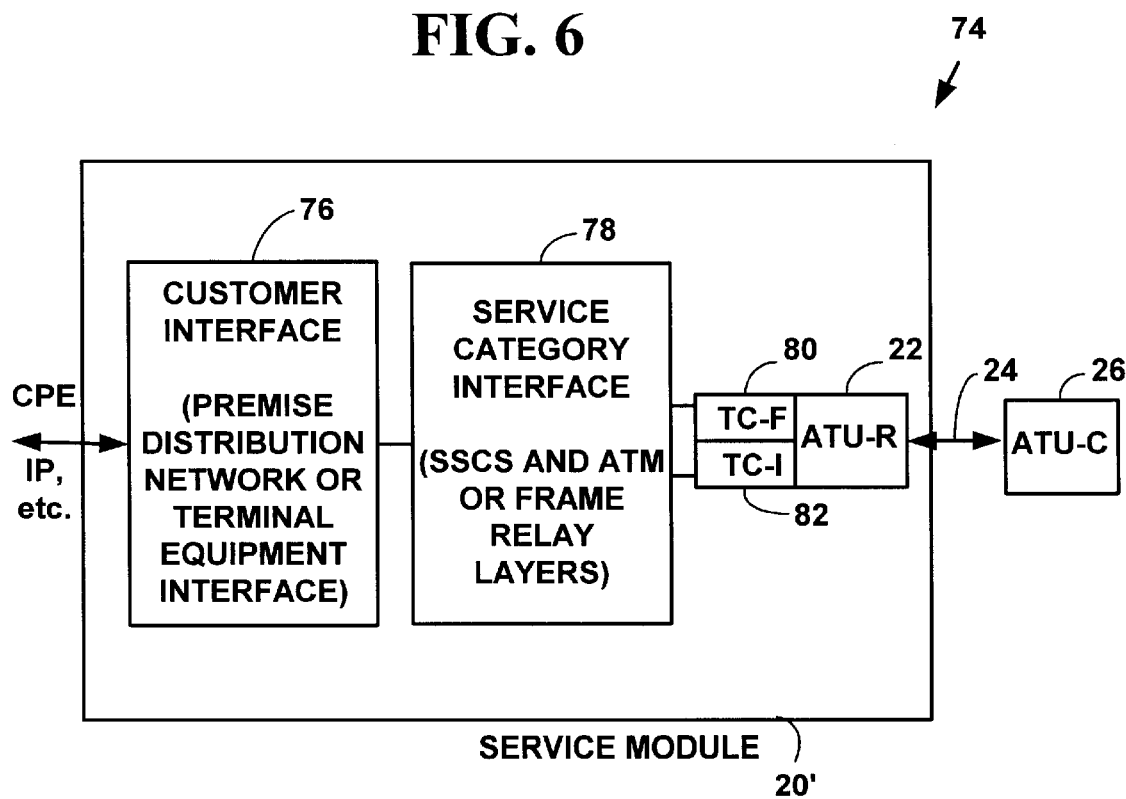
FIG. 6 is a block diagram illustrating an exemplary service module used in the exemplary ADSL data transmission system of FIG. 2.

FIG. 6 is a block diagram illustrating an exemplary ADSL service module 74 used in the exemplary ADSL data transmission system 18 of FIG. 2. The ADSL service module 74 includes a customer interface 76, a service category interface 78, a latency TC-F interface 80, a latency TC-I interface 82 and an ADSL ATU-R interface 22.

The customer interface 76 includes a Premise Distribution Network ("PDN") interface or Terminal Equipment ("TE") interface (e.g., Integrated Service Digital Network ("ISDN") TE, Integrated Digital Network ("IDN") TE, etc.) for a PDN connected to Customer Premise Equipment ("CPE"). The CPE either originates or terminates a PDN protocol such as the Internet Protocol ("IP"), ISDN protocol, etc. As was discussed above, IP is a routing protocol designed to route traffic within a network or between networks. Voice over Internet Protocol ("VoIP") is a protocol that can be used to send voice information in IP packets. More information on the Internet Protocol can be found in the Internet Engineering Task Force ("IETF") Request-for-Comments ("RFC"), RFC-791, the contents of which are incorporated herein by reference.

IP includes an eight-bit Type-of-Service ("ToS") field that can be used to distinguish differential CoS or QoS. As is known in the art, ToS typically specifies network tradeoffs that can be made to deliver data. ToS parameters typically include minimize delay, maximize throughput, maximize reliability, minimize monetary cost and other parameters. For more information on ToS use in IP, see IETF RFC-1349, the contents of which are incorporated herein by reference.

In one preferred embodiment of the present invention, the service category interface 78 includes a Service Specific Convergence Sub-layer ("SSCS") that examines IP ToS bits within an IP data packet before performing a ("SAR") function in the outgoing direction. In the incoming direction, an ATM, Frame Relay, or other transport layer performs a VCC multiplexing function on data cells or frames. The SSCS re-assembles cells or frames into IP data packets as will discussed below.

As was discussed above, the TC-F interface 80 is used for a Fast latency path and a TC-I interface 82 is used for an Interleaved latency path. The ADSL ATU-R interface 22 interface connects to an ADSL ATU-C interface 20 over the connection 24.

Figure 7:
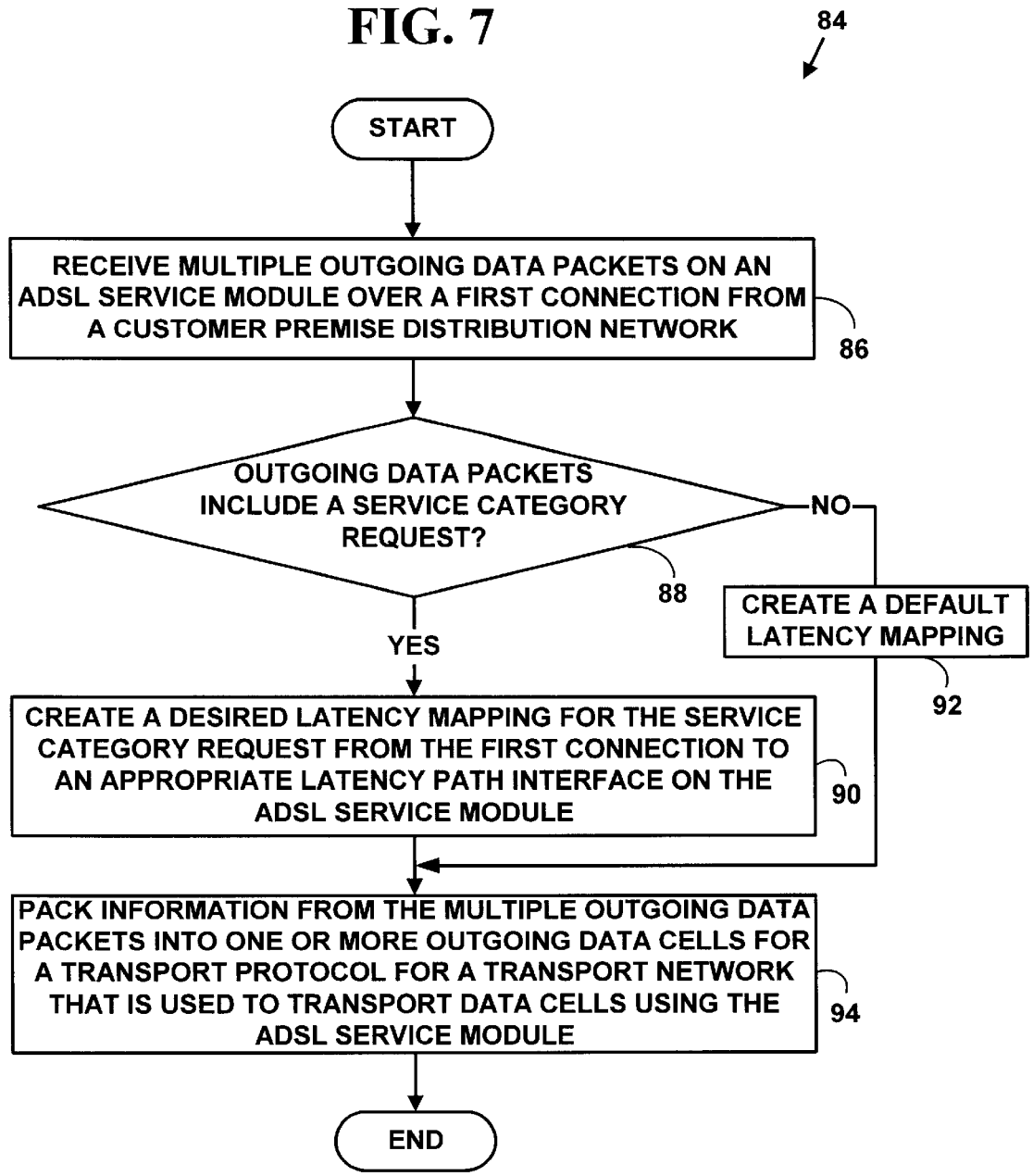
FIG. 7 is a flow diagram illustrating a method for mapping outgoing data packet service categories to latency paths in an asymmetric data transmission system.

Outgoing Data Packet Service Category Mapping to Latency Paths in an ADSL System FIG. 7 is a flow diagram illustrating a Method 84 for mapping data packet service categories to latency paths in an asymmetric data transmission system. At Step 86, multiple outgoing data packets are received on an ADSL service module from customer premise equipment over a first connection from a customer premise distribution network. At Step 88, a test is conducted to determine from the ADSL service module whether the outgoing data packets include a service category request. If at Step 88 the outgoing data packets include a service category request, at Step 90 a desired latency mapping is created for the service category request from the first connection to an appropriate latency path interface on the ADSL service module. If at Step 88 none of the multiple outgoing data packets includes a service category request, at Step 92 a default latency mapping is created to a default latency path interface on the ADSL service module. At Step 92, information from the multiple outgoing data packets is packed into one or more data cells for a transport protocol for a transport network that is used to transport data cells using the ADSL service module.

In one specific exemplary preferred embodiment of the invention, Method 84 is used on an ADSL transmission system 18 (FIG. 2) with exemplary ADSL service module 74 (FIG. 6) connected to an customer premise distribution IP network. However, the present invention is not limited to such an embodiment and other ADSL transmission systems with more or fewer components, other ADSL service modules, and other customer premise distribution networks (e.g., VoIP) can also be used.

In such a specific exemplary embodiment, at Step 86, multiple outgoing IP data packets are received on the customer interface 76 or ADSL service module 74 from a CPE, such as a customer computer, over a first connection from an IP network. The multiple outgoing IP data packets are sent to the service category interface 78. The ADSL service module 74 is used for Broadband Network Termination (B-NT). As is known in the art, a "broadband network" is a network on which transmissions travel over inbound and outbound channels. Network devices on a broadband network are connected by copper, coaxial or fiber-optic cables, which can carry data, voice, and video simultaneously over multiple transmission channels that are distinguished by frequency. A broadband network is capable of high-speed data transmission of up to 20 Mbps or more.

At Step 88, a test is conducted to determine from the service category interface 78 on the ADSL service module 74 whether any of the multiple outgoing IP data packets include a service category request in a ToS field. An SSCS layer in the service category interface 78 examines any ToS bits set in the IP data packets ToS field before performing a Segmentation and Re-assembly ("SAR") sub-layer function for ATM, Frame Relay or other transport protocol. Table 3 illustrates the ToS bits checked by an exemplary SSCS layer from an outgoing IP data packet in a ToS field. However, other service category fields can be checked by other layers and the present invention is not limited to the IP ToS bit checking illustrated in Table 3.

TABLE 3

| Preference (3-bits) | ToS (Type-of-Service) (4-bits) | MBZ (Must be zero) (1-bit) |
|---|---|---|
| 111 - network control | 1111 - high delay sensitivity and maximize reliability | This bit is currently unused by IP ToS. |
| 110 - Internetwork control | 1110 - unspecified | |
| 101 - CRITIC/ECP | 1101 - high delay sensitivity and lower reliability | |
| 100 - flash override | 1011 - medium delay and maximize reliability | |
| 011 - flash | 1010 - unspecified | |
| 010 - immediate | 1001 - medium delay and lower reliability | |
| 001 - priority | 0111 - low delay sensitivity and lower reliability | |
| 000 - routine | 0110 - unspecified | |
| * | 0101 - low delay sensitivity and lower reliability | |
| | 0011 - no delay sensitivity and maximize reliability | |
| | 0010 - unspecified | |
| | 0001 - no delay sensitivity and lower reliability | |
| | 0000 - no delay sensitivity and no reliability sensitivity | |

If at Step 88 any of the multiple outgoing IP data packets include a service category request in the ToS field, at Step 90 a desired latency mapping is created by the SSCS layer in the service category interface 78 for the service category request from the first connection to an appropriate latency path interface on the ADSL service module 74. The latency mapping is completed to either a Fast interface, TC-F 80, or an Interleaved interface, TC-I 82, connected to an ADSL ATU-R interface 22. The ADSL ATU-R interface 22 interface connects to an ADSL ATU-C interface 20 over the connection 24.

Table 4 illustrates exemplary IP-to-ADSL latency mapping rules. However, the present invention is not limited to the IP-to-ADSL latency mapping illustrated in Table 4 and other latency mapping rules for IP and other customer premise distribution network protocols can also be used.

TABLE 4

| DATA PREFERENCE | ToS | ADSL LATENCY PATH MAP |
|---|---|---|
| 000 - immediate | 1111 - minimum delay sensitivity & maximum reliability | Fast |
| 101 - CRITIC/ECP | 1111 - minimum delay sensitivity & maximum reliability | Interleaved |
| 010 - immediate | 1101 - minimum delay sensitivity & minimum reliability | Fast |
| 101 - CRITIC/ECP | 1101 - minimum delay sensitivity & minimum reliability | Interleaved |
| Don't care | 1011 - medium delay sensitivity & maximum reliability | Interleaved |
| Don't care | 1001 - medium delay sensitivity & med. Reliability | Fast |
| Don't care | 0111 - low delay & maximum reliability | Interleaved |
| Don't care | 0101 - low delay sensitivity & minimum reliability | Fast |
| Don't care | 0001 - no delay sensitivity & minimum reliability | Fast |
| Don't care | 0000 - no delay sensitivity & no reliability | Fast |

If at Step 88 none of the multile outgoing IP data packets include a service category request in the ToS field, at Step 92 a default latency mapping is created by SSCS layer in the service category interface 78 to a default latency path interface on the ADSL service module 74. In one exemplary preferred embodiment of the present invention, the default latency mapping is a Fast latency mapping to a TC-F 80 interface, comprising lower reliability and shorter delay. However, an Interleaved default mapping to TC-I interface 82 comprising higher reliability and longer delay can also be used and the present invention is not limited to a default fast latency mapping.

At Step 92, information from the multiple outgoing IP data packets are packed into one or more data cells for the ATM, Frame Relay or other transport protocol for an ATM, Frame Relay or other network that is used to transport data cells using the ADSL service module 74. The SSCS layer in the service category interface 78 performs a SAR function for outgoing data packets to create ATM, Frame Relay, or other outgoing data cells. The outgoing data cells are sent to a transport convenience sub-layer such as ATM, Frame Relay, or others, in the service category interface 78. The outgoing data cells are sent out from the ADSL service module 74 via a desired latency interface (e.g. TC-F 80 or TC-I 82) and the ADSL ATU-R interface 22 to an ADSL ATU-C interface 26.

Incoming Data Cell Service Category Mapping in an ADSL System

Figure 8:
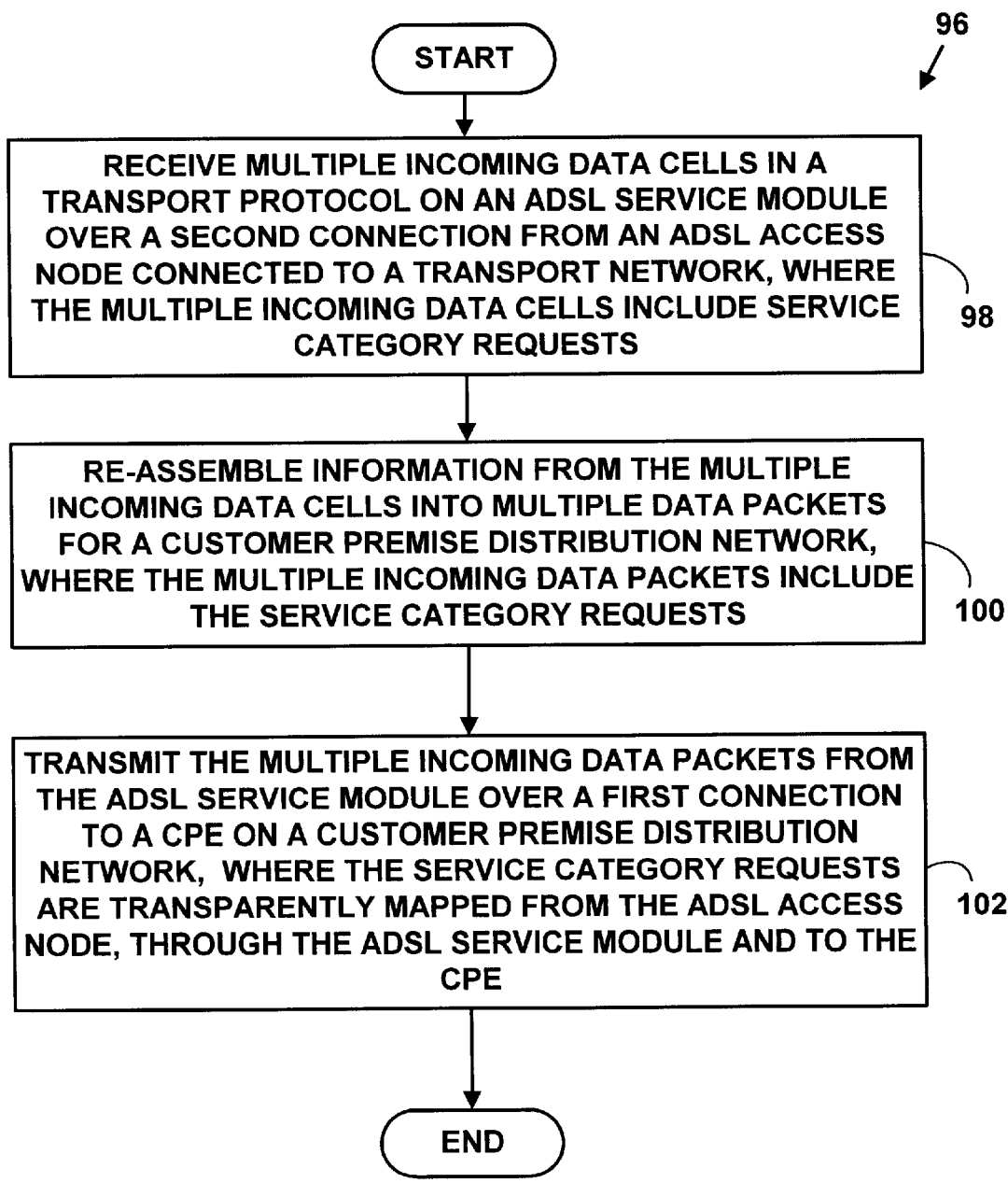
FIG. 8 is a flow diagram illustrating a method for mapping incoming data cell service categories in asymmetric data transmission system.

FIG. 8 is a flow diagram illustrating a Method 96 for mapping incoming data cell service categories in asymmetric data transmission system. At step 98, multiple incoming data cells in a transport protocol are received on an ADSL service module over a second connection from an ADSL access node connected to a transport network. The multiple incoming data packets include a service category request for a pre-determined ADSL latency mapping. At Step 100, information from the multiple incoming data cells in the transport protocol is re-assembled into multiple incoming data packets for a customer premise distribution protocol. The multiple data packets include the service category request. At Step 102, the multiple incoming data packets are transmitted from the ADSL service module over a first connection to a CPE on a customer premise distribution network. The service category requests with a pre-determined ADSL latency mapping are thereby transparently mapped from the ADSL access node, through the ADSL service module, and to the CPE.

In one specific exemplary preferred embodiment of the invention, Method 96 is used on an ADSL transmission system 18 (FIG. 2) with exemplary ADSL access node 36 (FIG. 3) connected to a transport network such as ATM or Frame Relay, etc., and exemplary ADSL service module 74 (FIG. 6) connected to a customer premise distribution network including an IP network. However, the present invention is not limited to such a specific embodiment and other ADSL transmission systems with more or fewer components, other ADSL service modules, ADSL access nodes and other customer premise distribution networks (e.g., VoIP, etc.) can also be used.

In such a specific embodiment, at Step 98 multiple incoming data cells in a transport protocol such as ATM, Frame Relay and others are received on latency interface (e.g., TC-F 80 or TC-I 82) from an ADSL ATU-R interface 22 on an ADSL service module 74 over a second connection 24. The second connection 24 connects the ADSL service module 74 to ADSL access node 28 that is connected to a transport network such as ATM, Frame Relay and others.

The multiple incoming data cells may include service category request such as CoS, QoS or ToS for a pre-determined latency mapping. In one exemplary preferred embodiment of the present invention, pre-determined latency mappings are determined by ADSL access node 36 (FIG. 3) using Method 50 (FIG. 4). However, the present invention is not limited to this implementation and other devices can also create the pre-determined latency mapping. Step 98 includes performing virtual channel connection de-multiplexing on multiple incoming data cells in a ATM, Frame Relay or other transmission convergence sub-layer on service category interface 78 the ADSL service module 74. However, the present invention is not limited to such an embodiment and other layers or sub-layers can also be used.

At Step 100, information from the multiple incoming data cells in the transport protocol are re-assembled into multiple incoming IP data packets. The multiple incoming IP data packets include the service category request. Step 100 includes re-assembling information from incoming ATM cells or Frame Relay frames into incoming IP data packets in a SSCS layer in the service category interface 78 on the ADSL service module 20. The service category interface 78 receives incoming dta cells from an ADSL latency interface (e.g., TC-F 80 or TC-I 82). However, the present invention is not limited to such an embodiment and other layer or sub-layers can also be used.

In one preferred embodiment of the present invention, no latency mapping is performed by the SSCS layer on incoming data cells. In another embodiment of the present invention, latency mapping based on a service category request can be performed by SSCS layer or other layers in the service category interface 78 on the ADSL service module 74.

At Step 102, the multiple incoming IP data packets received from the service category interface 78, are transmitted from the customer interface 76 on the ADSL service module 74 over a first connection to a CPE on a customer premise distribution network. The service category requests are thereby transparently mapped using a pre-determined ADSL latency mapping from the ADSL access node 36 connected to a transport network (FIG. 3), through the ADSL service module 74 (FIG. 6) connected to a customer premise distribution network, and to a CPE.

When ADSL access node 36 (FIG. 3) receives incoming data cells from ADSL service module 74 (FIG. 6) (i.e., outgoing data cells from the ADSL service module 74), the ADSL latency path used is the same pre-determined latency path that was selected and mapped by the ADSL service module 74 with Method 84 (FIG. 7).

When ADSL access node 36 receives outgoing data cells from a transport network, it selects and creates a desired transport-to-ADSL mapping as was described by Method 50 (FIG. 4) above. When the ADSL service module 74 receives the incoming data cells (i.e., outgoing data cells from the ADSL access node 36), the ADSL service module 74 uses Method 96 (FIG. 8) to transparently map the incoming data cells with a pre-determined ADSL latency path into incoming customer premise distribution network data packets including any service category requests to a CPE.

The methods and system described herein may offer the following advantages. A mapping to latency paths on ADSL system may allow differential services to be provided for user data from a customer premise distribution network based on a desired service category. The differential services on an ADSL device can be based on characteristics of the data traffic including: sensitivity to delay, throughput and reliability. The differential services on an ADSL device can be used to provide delay sensitive services such as multimedia services, ADSL voice services, and other delay sensitive services. The latency mapping mechanism at an ADSL link may help provide end-to-end virtual connections over real-time ADSL links.

It should be understood that the programs, processes, methods and systems described herein are not related or limited to any particular type of computer or network system (hardware or software), unless indicated otherwise. Various types of general purpose or specialized components may be used with or perform operations in accordance with the teachings described herein.

In view of the wide variety of embodiments to which the principles of the present invention can be applied, it should be understood that the illustrated embodiments are exemplary only. The illustrated embodiments should not be taken as limiting the scope of the present invention.

For example, the steps of the flow diagrams may be taken in sequences other than those described, and more or fewer elements may be used in the block diagrams. While various elements of the preferred embodiments have been described as being implemented in software, in other embodiments hardware or firmware implementations and vice-versa may alternatively be used.

The claims should not be read as limited to the described order or elements unless stated to that effect. Therefore, all embodiments that come within the scope and spirit of the following claims and equivalents thereto are claimed as the invention.

We claim:

1. A method for latency path mapping in an asymmetric data transmission system, comprising:

receiving a plurality of outgoing data packet on an asymmetric digital subscriber line service module from a customer premise equipment over a first connection from a customer premise distribution network;

determining from the asymmetric digital subscriber line service module whether any of the plurality of outgoing data packets include a service category request, and if so, creating a desired latency mapping for the service category request from the first connection to an appropriate latency path interface on the asymmetric digital subscriber line service module; and packaging information from the plurality of outgoing data packets into a plurality of data cells for a transport protocol for a transport network that is used to transport data cells using the asymmetric digital subscriber line service module.

2. The method of claim 1 wherein the customer premise distribution network is any of an Internet Protocol network or a Voice-over-Internet Protocol network.

3. The method of claim 1 wherein the step of determining from the asymmetric digital subscriber line service module whether the plurality of outgoing data packets include service category requests includes determining from a service specific convergence sub-layer whether the any of the plurality of outgoing data packet include service category requests.

4. The method of claim 1 wherein the step of determining from the asymmetric digital subscriber line service module whether any of the plurality of outgoing data packet include service category requests includes determining from a service specific convergence sub-layer whether any type-of-service bits are set in any of a plurality of outgoing Internet Protocol packets.

5. The method of claim 1 wherein the step of creating a desired latency mapping for the service category request from the first connection to an appropriate latency path interface on the asymmetric digital subscriber line service module includes creating a desired latency mapping to a fast transmission convergence interface or an interleaved transmission convergence interface connected to an asymmetric transmission unit-remote interface on the asymmetric digital subscriber line service module.

6. The method of claim 1 further comprising:

determining from the asymmetric digital subscriber line service module whether any of the plurality of outgoing data packet include service category requests, and if not, creating a default latency mapping to a default latency path interface on the asymmetric digital subscriber line service module.

7. The method of claim 1 wherein the packing step includes sending the plurality outgoing data packet to a segmentation and re-assembly sub-layer to create a plurality of outgoing transport data cells in a transport protocol for a transport network.

8. The method of claim 1 wherein the transport network is an Asynchronous Transport Mode network or a Frame Relay network.

9. A method for latency path mapping in an asymmetric data transmission system, comprising:

receiving a plurality of incoming data cells in a transport protocol on an asymmetric digital subscriber line service module over a second connection from an asymmetric digital subscriber line access node connected to a transport network, wherein the plurality of incoming data cells include service category requests for a pre-determined asymmetric digital subscriber line latency mapping;

re-assembling information from the plurality of incoming data cells in the transport protocol into a plurality of incoming data packets for a customer premise distribution protocol, wherein the plurality of data packets include the service category requests; and transmitting the plurality of incoming data packets from the asymmetric digital subscriber line service module over a first connection to customer premise equipment on a customer premise distribution network, wherein the service category requests with predetermined asymmetric digital subscriber line latency mappings are thereby transparently mapped from the asymmetric digital subscriber line access node, through the asymmetric digital subscriber line service module, and to the customer premise equipment.

10. The method of claim 9 wherein the step of receiving a plurality of incoming data cells in a transport protocol on an asymmetric digital subscriber line service module includes receiving the plurality of incoming data cells to a latency interface on the asymmetric digital subscriber line service module.

11. The method of claim 10 wherein the latency interface includes a transmission convergence-fast interface or a transmission convergence-interleaved latency interface connected to an asymmetric digital subscriber line transmission unit-remote interface.

12. The method of claim 9 wherein the step of re-assembling information from the plurality of incoming data cells comprises:

performing virtual connection de-multiplexing on the plurality of incoming data cells in a transport protocol in a transmission convergence sub-layer; and re-assembling information from the plurality of incoming data cells into a plurality of incoming data packets in a customer premise distribution network in a service specific convergence sub-layer.

13. The method of claim 12 wherein the step of performing virtual connection de-multiplexing on the plurality of incoming data cell include performing ATM or Frame Relay virtual channel or virtual path de-multiplexing on the plurality of incoming data cells.

14. The method of claim 12 wherein the step of re-assembling information from the plurality of incoming data cells includes re-assembling information from the plurality of incoming data cells into a plurality of Internet Protocol data packets with type-of-service bits set for a service category request, if any.

15. The method of claim 9 wherein the step of transmitting the plurality of data packets from the asymmetric digital subscriber line service module includes transmitting a plurality of incoming Internet Protocol data packets without checking any type-of-service bits, included in the plurality of incoming Internet Protocol data packets.

16. A latency mapping system for an asymmetric data transmission system, comprising in combination:

a latency mapping policy for mapping a desired service category for a customer premise distribution protocol to an asymmetric digital subscriber line latency path;

a service specific convergence sub-layer for examining service category requests from outgoing data packets for a customer premise distribution protocol, for mapping any service category requests to a desired asymmetric digital subscriber line latency path, for packing outgoing data packets for a customer premise distribution protocol into a plurality of data cells for a transport protocol and for re-assembling information from a plurality of incoming data cells from a transport network into a plurality of incoming data packets for a customer premise distribution protocol;

a transmission convergence sub-layer for accepting a plurality of outgoing data cells in a transport protocol created from a plurality of outgoing data packets for a customer premise distribution protocol with a determined asymmetric digital subscriber line latency mapping for a desired service category request, and for accepting a plurality of incoming data cells in a transport protocol with a predetermined asymmetric digital subscriber line latency mapping for a desired service category request, wherein a plurality of incoming data packets for a customer premise distribution protocol with the pre-determined asymmetric digital subscriber line latency mapping for a desired service category request are created from the plurality of incoming data cells and transparently mapped to customer premise equipment connected to a customer premise distribution network without checking any service category request fields in the plurality of data packets.

17. The system of claim 16 wherein the latency mapping policy includes a latency mapping policy to map type-of-service bits for a desired service category request in outgoing Internet Protocol data packets into an appropriate asymmetric digital subscriber line latency path.

18. The system of claim 16 wherein the appropriate asymmetric digital subscriber line latency path includes a fast latency path or an interleaved latency path.

19. A computer readable medium having stored therein instructions for causing a central processing unit to execute the following functions:

receiving a plurality of outgoing data packet on an asymmetric digital subscriber line service module from a customer premise equipment over a first connection from a customer premise distribution network;

determining from the asymmetric digital subscriber line service module whether any of the plurality of outgoing data packets include a service category request, and if so, creating a desired latency mapping for the service category request from the first connection to an appropriate latency path interface on the asymmetric digital subscriber line service module; and packaging information from the plurality of outgoing data packets into a plurality of data cells for a transport protocol for a transport network that is used to transport data cells using the asymmetric digital subscriber line service module.

20. A computer readable medium having stored therein instructions for causing a central processing unit to execute the following functions:

receiving a plurality of incoming data cells in a transport protocol on an asymmetric digital subscriber line service module over a second connection from an asymmetric digital subscriber line access node connected to a transport network, wherein the plurality of incoming data cells include service category requests for a pre-determined asymmetric digital subscriber line latency mapping;

re-assembling information from the plurality of incoming data cells in the transport protocol into a plurality of incoming data packets for a customer premise distribution protocol, wherein the plurality of data packets include the service category requests; and transmitting the plurality of incoming data packets from the asymmetric digital subscriber line service module over a first connection to customer premise equipment on a customer premise distribution network, wherein the service category requests with predetermined asymmetric digital subscriber line latency mappings are thereby transparently mapped from the asymmetric digital subscriber line access node, through the asymmetric digital subscriber line service module, and to the customer premise equipment.

* * * * *